US010701113B2

(12) United States Patent
Savolainen et al.

(10) Patent No.: US 10,701,113 B2
(45) Date of Patent: Jun. 30, 2020

(54) METHOD FOR SECURING HOST CONFIGURATION MESSAGES

(75) Inventors: Teemu Savolainen, Nokia (FI); Gabor Bajko, Santa Clara, CA (US)

(73) Assignee: Nokia Technologies Oy, Espoo (FI)

(*) Notice: Subject to any disclaimer, the term of this patent is extended or adjusted under 35 U.S.C. 154(b) by 1115 days.

(21) Appl. No.: 14/351,252

(22) PCT Filed: Oct. 25, 2011

(86) PCT No.: PCT/IB2011/054765
§ 371 (c)(1),
(2), (4) Date: Apr. 11, 2014

(87) PCT Pub. No.: WO2013/061114
PCT Pub. Date: May 2, 2013

(65) Prior Publication Data
US 2014/0325079 A1    Oct. 30, 2014

(51) Int. Cl.
*H04L 29/06* (2006.01)
*H04W 12/06* (2009.01)
(Continued)

(52) U.S. Cl.
CPC ...... *H04L 65/1073* (2013.01); *H04L 41/0866* (2013.01); *H04L 61/2015* (2013.01);
(Continued)

(58) Field of Classification Search
CPC .......... H04L 61/2015; H04L 65/1073; H04W 12/06; H04W 48/08
See application file for complete search history.

(56) References Cited

U.S. PATENT DOCUMENTS 7,228,417 B2 * 6/2007 Roskind ................. G06F 21/31
380/255
9,762,583 B2 * 9/2017 Guccione ............... G06F 21/33
(Continued)

FOREIGN PATENT DOCUMENTS

CN        1677978 A     10/2005
CN      101563883 A     10/2009
(Continued)

OTHER PUBLICATIONS

International Search Report received for corresponding Patent Cooperation Treaty Application No. PCT/IB2011/054765, dated Jul. 30, 2012, 4 pages.
(Continued)

*Primary Examiner* — Mohamed A. Wasel
(74) *Attorney, Agent, or Firm* — Alston & Bird LLP

(57) ABSTRACT

A method, apparatus and computer program product are provided for verifying an access network using for example a trusted protocol such as Hotspot 2.0. In this regard, a method is provided that includes causing at least one available network to be detected. The method may further include determining a fully qualified domain name (FQDN) for the at least one detected available network. The method may further include causing a registry entry to be accessed in a registry that corresponds to the determined FQDN, wherein the registry entry comprises at least one certificate for at least one network entity. The method may further include verifying received configuration information from the connected network, wherein verification comprises determining whether the received configuration information is signed with a digital certificate that corresponds to the at least one certificate in the accessed registry entry.

20 Claims, 7 Drawing Sheets

(51) Int. Cl.
*H04L 12/24* (2006.01)
*H04L 29/12* (2006.01)
*H04W 48/08* (2009.01)

(52) U.S. Cl.
CPC ........ *H04L 63/0823* (2013.01); *H04L 63/126* (2013.01); *H04W 12/06* (2013.01); *H04W 48/08* (2013.01)

(56) References Cited

U.S. PATENT DOCUMENTS

| | | | |
|---|---|---|---|
| 2003/0092425 | A1 | 5/2003 | Okazaki et al. |
| 2003/0212892 | A1* | 11/2003 | Oishi ............... H04L 29/12009 713/168 |
| 2005/0078824 | A1* | 4/2005 | Malinen .................. H04L 63/08 380/247 |
| 2005/0223412 | A1* | 10/2005 | Nadalin .............. G06F 21/6209 726/3 |
| 2005/0243872 | A1 | 11/2005 | Monai |
| 2006/0039564 | A1 | 2/2006 | Rao |
| 2007/0276900 | A1* | 11/2007 | Wang ..................... G06Q 10/06 709/203 |
| 2007/0297396 | A1* | 12/2007 | Eldar ..................... H04L 63/08 370/356 |
| 2008/0148044 | A1 | 6/2008 | Upp et al. |
| 2009/0216842 | A1* | 8/2009 | Risher .................. G06Q 10/107 709/206 |
| 2010/0071040 | A1 | 3/2010 | Upp et al. |
| 2013/0024921 | A1* | 1/2013 | Gupta ................. H04L 63/0823 726/6 |

FOREIGN PATENT DOCUMENTS

| | | |
|---|---|---|
| EP | 2259542 A1 | 12/2010 |
| WO | 2008153456 | 12/2008 |
| WO | 2009/035829 A1 | 3/2009 |
| WO | 2011/073516 A1 | 6/2011 |

OTHER PUBLICATIONS

Chown et al., "Rogue IPv6 Router Advertisement Problem Statement", Internet Engineering Task Force (IETF), Request for Comments: 6104, Feb. 2011, pp. 1-16.
Levi-Abegnoli et al., "IPv6 Router Advertisement Guard", Internet Engineering Task Force (IETF), Request for Comments: 6105, Feb. 2011, pp. 1-10.
Gont, "IPv6 Router Advertisement Guard (RA-Guard) Evasion", IPv6 Operations Working Group (v6ops), Internet-Draft, Jun. 8, 2011, pp. 1-16.
"Rogue DHCP", Wikipedia, Retrieved on Sep. 4, 2014, Webpage available at : http://en.wikipedia.org/wiki/Rogue_DHCP.
"Secure Neighbor Discovery", Wikipedia, Retrieved on Sep. 4, 2014, Webpage available at : http://en.wikipedia.org/wiki/Secure_Neighbor_Discovery.
Arkko et al., "SEcure Neighbor Discovery (SEND)", Network Working Group, Request for Comments: 3971, Mar. 2005, pp. 1-56.
Droms et al., "Authentication for DHCP Messages", Network Working Group, Request for Comments: 3118, Jun. 2001, pp. 1-17.
Droms et al., "Dynamic Host Configuration Protocol for IPv6 (DHCPv6)", Network Working Group, Request for Comments: 3315, Jul. 2003, pp. 1-101.
Narten et al., "Neighbor Discovery for IP Version 6 (IPv6)", Network Working Group, Request for Comments: 4861, Sep. 2007, pp. 1-97.
Kent, "IP Authentication Header", Network Working Group, Request for Comments: 4302, Dec. 2005, pp. 1-34.
Kent et al., "Security Architecture for the Internet Protocol", Network Working Group, Request for Comments: 4301, Dec. 2005, pp. 1-101.
Manral, "Cryptographic Algorithm Implementation Requirements for Encapsulating Security Payload (ESP) and Authentication Header (AH)", Network Working Group, Request for Comments: 4835, Apr. 2007, pp. 1-11.
"IPsec", Wikipedia, Retrieved on Sep. 4, 2014, Webpage available at : http://en.wikipedia.org/wiki/Ipsec.
Nikander et al., "IPv6 Neighbor Discovery (ND) Trust Models and Threats", Network Working Group, Request for Comments: 3756, May 2004, pp. 1-23.
Alexander et al., "DHCP Options and BOOTP Vendor Extensions", Network Working Group, Request for Comments: 2132, Mar. 1997, pp. 1-34.
"The Future of Hotspots: Making Wi-Fi as Secureand Easy to Use as Cellular", White Paper, CISCO, 2012, pp. 1-9.
Extended European Search Report received for corresponding European Patent Application No. 11874464.8, dated Feb. 20, 2015, 7 pages.
Office action received for corresponding Chinese Patent Application No. 201180074388.4, dated Dec. 21, 2016, 7 pages of office action and 3 pages of office action translation available.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          OPTION_AUTH          |           option-len          |
+-+-+-+-+-+-+-+-+-+-+-+-+-+-+-+-+-+-+-+-+-+-+-+-+-+-+-+-+-+-+-+-+
|   protocol    |   algorithm   |
+-+-+-+-+-+-+-+-+-+-+-+-+-+-+-+-+
|                           Signature                           |
+-+-+-+-+-+-+-+-+-+-+-+-+-+-+-+-+-+-+-+-+-+-+-+-+-+-+-+-+-+-+-+-+ option-code      OPTION_AUTH (code TBD)

option-len       2 + length of signature protocol         Hotspot 2.0 certificate framework (or
                 something, tbd)

algorithm        The algorithm used in the
                 authentication protocol -- to be defined what signature        Digital signature as described
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       OPTION_DHCP_SERVER_CERT         |          option-len   |
+-+-+-+-+-+-+-+-+-+-+-+-+-+-+-+-+-+-+-+-+-+-+-+-+-+-+-+-+-+-+-+-+
.                   DHCPv6 server certificate                   .
.                                                               .
+-+-+-+-+-+-+-+-+-+-+-+-+-+-+-+-+-+-+-+-+-+-+-+-+-+-+-+-+-+-+-+-+

OPTION_DHCP_SERVER_CERT       Option code
option-len                    Length of certificate
DHCPv6 server certificate     The certificate
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     CODE      |      Len      |
+-+-+-+-+-+-+-+-+-+-+-+-+-+-+-+-+-+-+-+-+-+-+-+-+-+-+-+-+-+-+-+-+
.                   DHCPv4 server certificate                   .
.                                                               .
+-+-+-+-+-+-+-+-+-+-+-+-+-+-+-+-+-+-+-+-+-+-+-+-+-+-+-+-+-+-+-+-+

CODE                          Option code TBD
Len                           Length of certificate
DHCPv4 server certificate     The certificate
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   Cert Type   |   Reserved    |
+-+-+-+-+-+-+-+-+-+-+-+-+-+-+-+-+-+-+-+-+-+-+-+-+-+-+-+-+-+-+-+-+
|    Certificate ...                                            |
+-+-+-+-+-+-+-+-+-+-+-+-+-+-+-+-+-+-+-+-+-+-+-+-+-+-+-+-+-+-+-+-+
|                 ...       Padding                             |
+-+-+-+-+-+-+-+-+-+-+-+-+-+-+-+-+-+-+-+-+-+-+-+-+-+-+-+-+-+-+-+-+
```

Type

16

Length

The length of the option (including the Type, Length, Cert Type, Pad Length, and Certificate fields), may be in units of 8 octets.

Cert Type

The type of the certificate included in the Certificate field. This specification defines legal value for this field, such as, but not limited to:

1       X.509v3 Certificates, as specified below
      2       X.509 Hotspot 2.0 sender certificate Reserved An 8-bit field reserved for future use. The value may be initialized to zero by the sender and may be ignored by the receiver.

Certificate

In an instance in which the Cert Type field is set to 1, the Certificate field may contains an X.509v3 certificate [7].

When the Cert Type field is set to 2, the Certificate field may contains a trusted network certificate, such as a Hotspot 2.0 certificate.

Padding

A variable length field making the option length a multiple of 8, beginning after the ASN.1 encoding of the previous field [7, 15] ends and continuing to the end of the option, as specified by the Length field.

FIG. 7

METHOD FOR SECURING HOST CONFIGURATION MESSAGES

RELATED APPLICATION

This application was originally filed as PCT Application No. PCT/IB2011/054765 filed Oct. 25, 2011.

TECHNOLOGICAL FIELD

Some embodiments of the present invention relate generally to communications technology and, more particularly, to securing host configuration messages in wireless environments.

BACKGROUND

A host, such as a mobile terminal, may be configured to receive address configuration information via internet protocol (IP) version 6 (v6) router advertisements (RA) or dynamic host configuration protocol (DHCP)v6 messages, however the host, such as the mobile terminal, may not be able to verify the legitimacy of the RA or DHCP messages. Such inabilities to verify the legitimacy of messages may lead to attacks, such as rogue RA attacks. Additionally, in an instance in which rogue DHCP servers are used, the mobile terminal likely will not be able to determine if a DHCP server is a legitimate server to assign IP addresses for that network. The inability to verify the legitimacy of the assigned IP address may allow attackers to misconfigure mobile terminals the way they see fit, for example, an attacker may cause a mobile terminal to use wrong source addresses or may lead a misconfigured router/server to assign incorrect IP addresses to mobile terminals undetected. In effect attackers may place both denial-of-service attacks and/or setup hosts for man-in-the-middle attacks. Alternatively or additionally, mobile terminal IP address misconfiguration may happen also in cases of router or DHCP server misconfigurations, when the router or the server sends a RA/DHCP_offer messages that leak into network segments where they are not supposed to.

Additionally service set identifier (SSID) trustworthiness is also a problem. For example, it is increasingly popular for attackers to setup up a SSID with a name like "Sprint" or "ATT" and in response users may join such networks thinking that they are trusted providers and wireless services.

BRIEF SUMMARY

A method, apparatus and computer program product are therefore provided according to an example embodiment in order to verify an access network using for example a network deployment, such as a Hotspot 2.0 type network deployment. According to an embodiment, a mobile terminal may access a trusted network registry, such as a Hotspot 2.0 registry entry, for a particular access network (AN) that corresponds to a fully qualified domain name (FQDN) of the discovered access network. Using the trusted network registry, such as the Hotspot 2.0 registry entry, the mobile terminal may download a service provider record for a verified AN that may include certificates signed by a trusted authority. Such certificates may also identify verified routers, DHCP servers and/or DNS servers that are currently operating on the verified AN. Using the verified certificates, in some example embodiments, the mobile terminal may then be configured to verify that various RA, DHCP messages or the like are legitimate and further the mobile terminal may access the verified AN.

In this regard, a method is provided that includes causing at least one available network to be detected. The method may further include determining a fully qualified domain name (FQDN) for the at least one detected available network. The method may further include causing a registry entry to be accessed in a registry that corresponds to the determined FQDN, wherein the registry entry comprises at least one certificate for at least one network entity. The method may further include causing a connection to the at least one detected available network. The method may further include verifying received configuration information from the connected network, wherein verification comprises determining whether the received configuration information is signed with a digital certificate that corresponds to the at least one certificate in the accessed registry entry.

An example apparatus may include at least one processor and at least one memory storing computer program code, wherein the at least one memory and stored computer program code are configured, with the at least one processor, to cause the apparatus to cause at least one available network to be detected. The at least one memory and stored computer program code are further configured, with the at least one processor, to cause the apparatus to determine a fully qualified domain name (FQDN) for the at least one detected available network. The at least one memory and stored computer program code are further configured, with the at least one processor, to cause the apparatus to cause a registry entry to be accessed in a registry that corresponds to the determined FQDN, wherein the registry entry comprises at least one certificate for at least one network entity. The at least one memory and stored computer program code are further configured, with the at least one processor, to cause the apparatus to cause a connection to the at least one detected available network. The at least one memory and stored computer program code are further configured, with the at least one processor, to cause the apparatus to verify received configuration information from the connected network, wherein verification comprises determining whether the received configuration information is signed with a digital certificate that corresponds to the at least one certificate in the accessed registry entry In a further embodiment, a computer program product is provided that includes at least one non-transitory computer-readable storage medium having computer-readable program instructions stored therein, the computer-readable program instructions includes program instructions configured to cause at least one available network to be detected. The computer-readable program instructions also include program instructions configured to determine a fully qualified domain name (FQDN) for the at least one detected available network. The computer-readable program instructions also include program instructions configured to cause a registry entry to be accessed in a registry that corresponds to the determined FQDN, wherein the registry entry comprises at least one certificate for at least one network entity. The computer-readable program instructions also include program instructions configured to cause a connection to the at least one detected available network. The computer-readable program instructions also include program instructions configured to verify received configuration information from the connected network, wherein verification comprises determining whether the received configuration information is signed with a digital certificate that corresponds to the at least one certificate in the accessed registry entry One example apparatus may include means for at least one available network to be detected. The apparatus may also include means for determining a fully qualified domain name (FQDN) for the at least one detected available network. The apparatus may also include means for causing a registry entry to be accessed in a registry that corresponds to the determined FQDN, wherein the registry entry comprises at least one certificate for at least one network entity. The apparatus may also include means for causing a connection to the at least one detected available network. The apparatus may also include means for verifying received configuration information from the connected network, wherein verification comprises determining whether the received configuration information is signed with a digital certificate that corresponds to the at least one certificate in the accessed registry entry

BRIEF DESCRIPTION OF THE DRAWINGS

Figure 1:
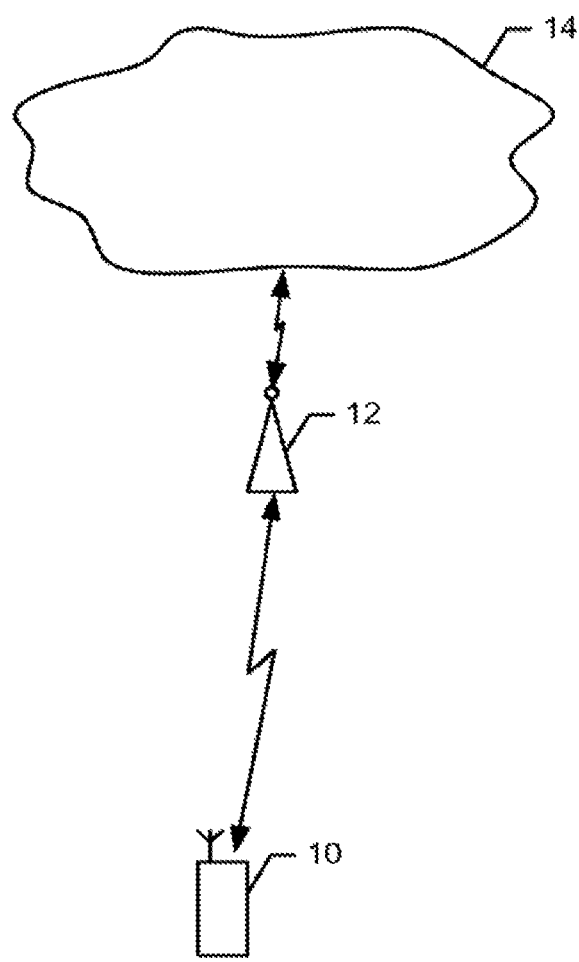
Figure 2:
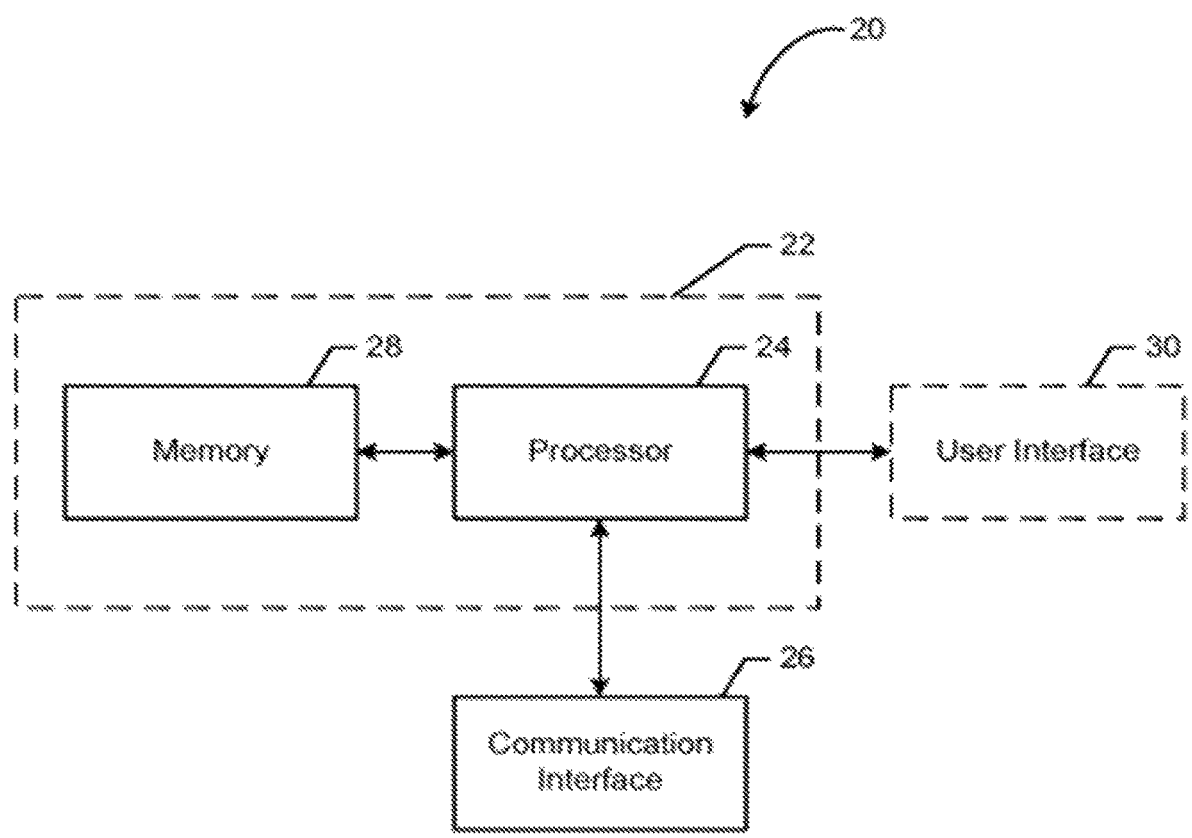
Figure 3:
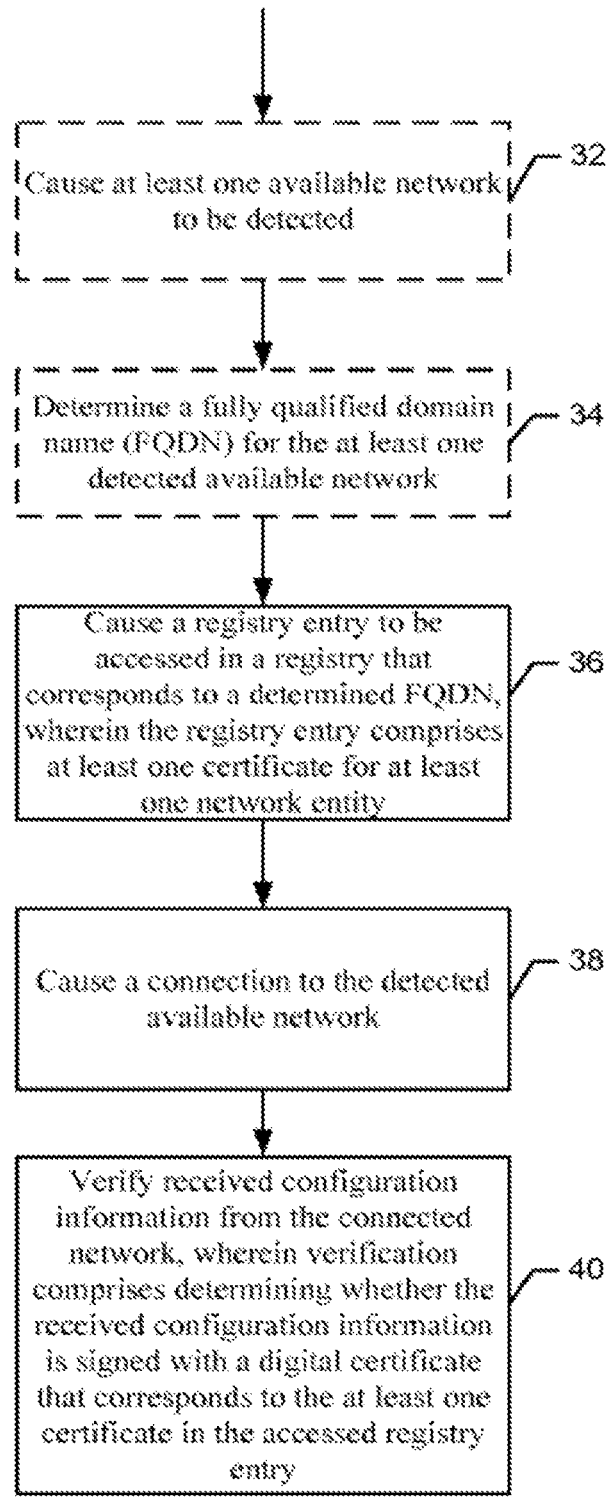
Figure 8:
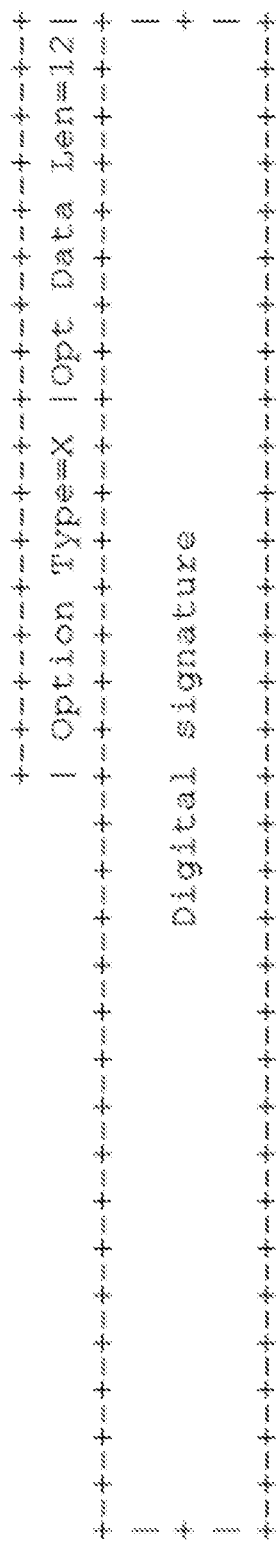

Having thus described the example embodiments of the invention in general terms, reference will now be made to the accompanying drawings, which are not necessarily drawn to scale, and wherein:

FIG. 1 is a schematic representation of a system having a mobile terminal that may experience host configuration messages and that may benefit from an embodiment of the present invention;

FIG. 2 is a block diagram of an apparatus that may be embodied by a mobile terminal in accordance with one embodiment of the present invention;

FIG. 3 is a flow chart illustrating operations performed in accordance with one embodiment of the present invention;

FIG. 4 illustrates an example of a dynamic host configuration protocol message;

FIG. 5 illustrates an example of a dynamic host configuration protocol server certificate;

FIG. 6 illustrates an example of a dynamic host configuration protocol server certificate;

FIG. 7 illustrates an example of a dynamic host configuration protocol message; and FIG. 8 illustrates an example of a Destination Header for transporting a signature.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product of an example embodiment of the present invention may be configured to operate on, in conjunction with a Hotspot 2.0 network. An example mobile terminal of an example embodiment of the current invention may be configured to cause a trusted network entity, such as Hotspot 2.0 registry, to be queried and then may cause an entry to be downloaded which may consist of at least of portion of the following non-exclusive list: the Hotspot's Access Network (AN) fully qualified domain name (FQDN), the AN Authentication, Authorization and Accounting (AAA) server certification, and other trusted network elements such as HotSpot2.0 specific elements like the certification path between the Hotspot2.0 network entity's trust anchor (e.g., Hotspot2.0 WiFi Root CA) and a sender's (e.g. access network router's) public key. The sender, in this example, may be a network entity which generates the message (e.g. network entity, such as a router, DHCP server, DNS server, etc.).

A Generic Advertisement Service (GAS) Access Network Query Protocol (ANQP) procedures defined in 802.11, which is hereby incorporated by reference, to download a "Hotspot Online Sign-up Providers list" L2 element have the following content:

| | Online Sign Up (OSU) Provider Length | OSU FQDN Length | OSU FQDN | OSU_NAI (Network Access Identifier) Length | OSU_NAI (optional) | OSU Server URI (Uniform Resource Identifier) Length | OSU Server URI | OSU Method |
|---|---|---|---|---|---|---|---|---|
| Octets: | 2 | 1 | Variable | 1 | variable | 1 | variable | 1 |

Although the method, apparatus and computer program product may be implemented in a variety of different systems, one example of such a system is shown in FIG. 1, which includes a first communication device (e.g., mobile terminal 10) that is capable of communication via a network entity 12, such as a wireless router, a base station, a Node B, an evolved Node B (eNB), WiFi Station or other network entity, with a network 14 (e.g., a core network). While the network may be configured in accordance with wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like.

Other communications may be envisioned, but are not required in the current invention such as Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like. Alternatively or additionally. The network 14 may include a collection of various different nodes, devices or functions that may be in communication with each other via corresponding wired and/or wireless interfaces. For example, the network may include one or more cells, including network entity 12, each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE), wireless station (STA) or the like), may be in communication with other communication devices or other devices via the network entity 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, the mobile terminal 10 and/or the network entity 12 may be embodied as or otherwise include an apparatus 20 as generically represented by the block diagram of FIG. 2. While the apparatus 20 may be employed, for example, by a mobile terminal 10 or a network entity 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as a network entity 12, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the network entity 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIG. 3 is a flowchart illustrating the operations performed by a method, apparatus and computer program product, such as apparatus 20 of FIG. 2, in accordance with one embodiment of the present invention is illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry 22, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (an example of which is shown in dashed lines in FIG. 3). It should be appreciated that each of the modifications, optional additions or amplifications below may be included with the operations above either alone or in combination with any others among the features described herein.

Referring now to FIG. 3, the operations of a method, apparatus and computer program product are configured to determine whether a discovered network of interest is an authorized network in order to enable a connection between an example mobile terminal and an example network entity. As is shown in operation 32, the apparatus 20 may include means, such as the processing circuitry 22, the processor 24, the communications interface 26 or the like, for causing at least one available network to be detected. In an embodiment, an apparatus 20 using means such as the processing circuitry 22, the processor 24, the communications interface 26 or the like, may scan for a network of interest according to 802.11 specifications. Other wireless or wireline specifications may also be used in some example embodiments.

In an instance in which the apparatus, such as the processing circuitry 22, the processor 24, the communications interface 26 or the like discovers a network of interest (e.g. an AN), the processing circuitry 22, the processor 24, the communications interface 26 or the like may cause a query to be transmitted that causes an online signup (OSU) provider list to be downloaded and stored in the memory 26. Alternatively or additionally, the OSU provider list may be stored remotely or stored in the memory 28.

In example embodiments, the processing circuitry 22, the processor 24, the communications interface 26 or the like may also download and/or access an FQDN for the discovered network of interest and a related service provider (SP) record. See operation 34. In some example embodiments, the FQDN and the SP are downloaded and/or accessed from a registry (e.g. trusted network registry, Hotspot 2.0 registry or the like) and certificates of the SP may be signed by a trusted authority, such as by the WiFiAlliance RootCA. The SP record, in some example embodiments, may contain but is not limited to: the name of the SP, the FQDN of the SP, the icon of the SP and the certificates of the SP AAA server and signup server. In example embodiments, the SP record may be extended to include certificates for a plurality of network entities that provide a connection to the network of interest such as, but not limited to, a network entity (e.g. a router, DHCP server and/or DNS server).

Alternatively or additionally, a mobile terminal may attempt to gather trusted network registry entities, such as Hotspot 2.0 registry entries, prior to attempting to access a network of interest. See operation 36. The processing circuitry 22, the processor 24, the communications interface 26 may cause a request for Hotspot 2.0 registry entry to be accessed before the mobile terminal associates to the Hotspot2.0 AN (e.g. using layer 2 as transport to access the registry, as defined, for example, in the WiFi Alliance (WFA) specification) or using an existing Internet connection (e.g. via 3G or the like). The trusted network, such as the Hotspot 2.0 network, SP records may also be preconfigured or downloaded at any time and stored in a mobile terminal's memory, such as memory 28 (e.g. an SP record once generated and signed by the WiFi Root CA, may then become a self-containing unmodifiable piece of data).

By way of example, with a certificate issued to a network entity (e.g. router, DHCP_server, DNS, and/or the like) by the network's AAA server, the network entity may then use, for example, its private key from the certificate to sign for example RA, DHCP, and/or DNS_messages. The network entity, such as, may use either the mobile terminal's medium access control (MAC) address or a nonce provided by the mobile terminal in the request to generate a signature. In some example embodiments, the signature in the response message is transmitted from the network entity to a mobile terminal may be added to and/or attached to an address, prefix, FQDN and/or other configuration provided to the mobile terminal. The signature may also be generated over the configuration information provided to the mobile terminal, for example the FQDN of the entity generating the signature (as present in its certificate) and/or the identity or random number belonging to the mobile terminal. The response may also contain the hash of the public key of the entity used to sign the message to allow the mobile terminal to easily identify which entity from the SP record signed the response message.

Alternatively or additionally, a router solicitation (RS) may contain either a link-layer address option and/or a nonce option, which then may be included fields, such as an FQDN field, signed by the entity that generated the digital signature. In instances of DHCP, a MAC address of the mobile terminal and/or a nonce sent by the mobile terminal may be part of the generated signature. DHCP, or DHCPv6 messages may also contain a valid signature of a network element which is authorized to IP provision at least one mobile terminal associated to that access network.

Alternatively or additionally, the processing circuitry 22, the processor 24, the communications interface 26 may be configured to receive an RA and/or DHCP response that may contain an option carrying the certificate of the sender. The certificate in this instance may be present in the registry, or may be signed using the certificate of the AAA server present in the registry entry. The certificates used in signing the RA or DHCPv6 messages may be issued and signed by the AAA server or any alternate intermediate entity which has a certificate issued by the SP's AAA server. In an instance in which there are intermediate entities, the certificates of the intermediate entities may be part of the SP record in the registry.

Alternatively or additionally, in an instance in which a trusted network, such as a Hotspot 2.0 network of interest has many network entities, such as Router, DHCP servers, may not have each of the certificates of all these network entities in a trusted network registry, such as a Hotspot 2.0 registry. Thus, the trusted registry that is configured to be accessible by a mobile terminal may have the AAA server certificate, and thus in an instance in which a network entity, such as a router, provides the RA to a host, the RA may have a certificate option containing the certificate of the router, signed with the certificate of the AAA server.

In example embodiments, after the mobile terminal has accessed and/or downloaded abovementioned at least one of the FQDN of the discovered network of interest, a trusted certificate or the like, the processing circuitry 22, the processor 24, the communications interface 26 or the like may then cause a connection to a network entity. See operation 38. In some example embodiments, a trusted certificate or the like, the processing circuitry 22, the processor 24, the communications interface 26 or the like verify an RA and/or DHCP/DHCPv6 messages received from the network entity are legitimate. See operation 40. For example, the processing circuitry 22, the processor 24, the communications interface 26 may cause an IPv6 RS or DHCP(v6) request to be issued, and the router/server may then reply with a RA or DHCP(v6) offer, which may be signed by the router/server certificates that were downloaded, for example, apriori from the registry.

In an embodiment, the apparatus 20 may include means, such as the processing circuitry 22, the processor 24, the communications interface 26 or the like, may determine whether the IP address information is from an entity which belongs to the discovered network of interest and it is the authorized entity to issue IP configuration related messages. In determining whether the IP configuration messages come from an authorized entity, the processing circuitry 22, the processor 24, may use the accessed and/or downloaded certificate information to verify that the received RA or DHCP messages are from a trusted and authorized source.

One example verification method may include, in an instance in which a mobile terminal successfully retrieved an SP record from a trusted network registry, such as a Hotspot2.0 Registry and successfully verified that the received RS/RA messages contain a digital signature of the IP address and nonce or identity belonging to a particular mobile terminal (e.g. a client device), and that the digital signature is generated by an entity whose digital certificate is present or it is issued by an entity present in the registry.

Another example verification method may include an IPv6 header option, such as Destination Option, which may be defined to contain the signature of the message. An IPv6 header option may further be defined to carry in a router advertisement a signature over an assigned IP address and an identity or random number belonging to the client. The additional benefit of this approach is that an example mobile terminal that does not understand this verification framework may ignore the authentication option and still may be configured to operate on the trusted network.

In an example embodiment, in an instance in which a host, such as a mobile terminal, receives both signed and unsigned configuration information (e.g. from different senders), the host, such as the mobile terminal, may then determine to use the information that comes from the trusted and authorized party. Alternatively or additionally, a host may be configured so that it only accepts information from trusted parties, such as in selected access networks/network types. Thus the mobile terminal 10 may then decide, using for example the processor 24, whether to accept IP address configuration information in an instance in which a signature is verified and the network entity that signed the certificate is one of the network entities whose certificate is in the registry or is issued by an entity whose certificate in the registry. Such a configuration may, for example, mitigate against attacks where an attacker is able to block communications between an example mobile terminal and an example network entity. Verifying that the IP address is received from an authorized network entity protects the mobile terminal against being misconfigured because of an unintentional router/server misconfiguration.

In some example embodiments, a network entity such as network entity 12 may be configured to issue RAs. The network entities may then be further configured to provide the authentication option based on a defined RA option, or alternatively, the key hash, digital signature and nonce options defined in, for example, the Secure Neighbor Discovery (SEND) protocol (SEND is defined in RFC3971 which is incorporated by reference herein) can be re-used. In some example embodiments, a signature is generated over a number of fields, one of the fields being the FQDN of the entity which generates the signature. Alternatively or additionally, in an instance in which the sender's certificate is not in the registry, the RA will need to have an additional option, carrying the certificate of the sender (which also needs to be part of the fields included in signature generation).

In example embodiments DHCP(v6) may be used according the systems and methods described herein. To enable the use of DHCP(v6), an authentication protocol may be defined by an example network entity to carry a hash and a signature. A trusted network capable mobile terminal, such as Hotspot2.0 capable mobile terminal, may be configured, using the processing circuitry 22, the processor 24, the communications interface 26 or the like, to cause a request for a DHCP authentication option from the server whenever the mobile terminal causes a DHCP Discover or DHCP request message to be issued.

One example verification method may include a DHCPv6 Authentication Option (see e.g. RFC3315 section 22.11 which is incorporated by reference) may be defined for a particular trusted network, such as a Hotspot 2.0 framework. Alternatively or additionally, an alternative DHCPv6 option may be defined, such an authentication includes but is not limited to that illustrated in FIG. 4.

The example DHCP authentication option illustrated in FIG. 4 may be defined in an Internet Engineering Task Force (IETF) specification, with "algorithm", "replay detection", and "authentication information" fields.

Referring now to FIGS. 5 and 6, examples, respectively, of DHCPv6 and DHCPv4 server certificate options are illustrated.

Referring now to FIG. 7, an example of another option defining a completely new option with a similar structure is illustrated. FIG. 8 illustrates an example Destination Options header for transporting the signature.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
causing at least one available network to be detected;
causing a query to be transmitted that causes an online signup provider list to be downloaded and stored;
determining a fully qualified domain name (FQDN) for the at least one detected available network;
causing a registry entry to be accessed in a registry stored on a service provider's server that corresponds to the determined FQDN and causing a service provider record to be downloaded from the registry, wherein the service provider record comprises at least one certificate for at least one network entity different from the service provider's server, the at least one network entity operating on the at least one available network and comprising at least one dynamic host configuration protocol (DHCP) server or at least one domain name system (DNS) server;
causing a connection to the at least one detected available network based at least partially on the service provider record;
receiving, after causing the connection to the at least one detected available network, an authentication option based on a router advertisement (RA) option;
receiving, after receiving said authentication option, configuration information from the at least one connected network; and
verifying the received configuration information from the at least one connected network based on the authentication option, wherein verification comprises determining whether the received configuration information is signed with a digital certificate that corresponds to the at least one certificate in the accessed registry entry.

2. A method according to claim 1 wherein the accessed registry entry includes certificates for at least one of a router, Dynamic Host Configuration Protocol (DHCP) server or Domain Name System (DNS) server of a service provider.

3. A method according to claim 1 further comprising receiving a message comprising a signature from at least one of a router, DHCP server or DNS server, wherein the signature further comprises at least one of an identity or random number belonging to a mobile terminal.

4. A method according to claim 1 further comprising receiving a message comprising a signature from at least one of a router, DHCP server or DNS server, wherein the message further comprises a hash of a public key used to sign the message, to determine a network entity from a service provider record that signed the message.

5. A method according to claim 1 further comprising receiving a router advertisements, DHCP, or DHCPv6 messages, and determining whether the received router advertisements, DHCP, or DHCPv6 messages are from a verified legitimate network entity and causing a connection to the verified access network in an instance in which the received messages contain a valid signature of a network element which is authorized to IP provision at least one mobile terminal associated to that access network.

6. A method according to claim 1 wherein a network entity is authorized in an instance in which the network entity has a corresponding certificate in the registry or the network entity has a certificate that is issued by an entity that has a corresponding certificate in the registry.

7. A method according to claim 4 wherein the signature includes at least one field, wherein one of the fields includes the FQDN of an entity that generated the digital signature.

8. A method according to claim 1, further comprising accepting an IP address configuration information in an instance in which a signature is verified and at least one of the network entity has a corresponding certificate in the registry or the network entity has a certificate that is issued by an entity that has a corresponding certificate in the registry.

9. An apparatus comprising:
a processor and
a memory including software, the memory and the software configured to, with the processor, cause the apparatus to at least:
cause at least one available network to be detected;
cause a query to be transmitted that causes an online signup provider list to be downloaded and stored;
determine a fully qualified domain name (FQDN) for the at least one detected available network;
cause a registry entry to be accessed in a registry stored on a service provider's server that corresponds to the determined FQDN and cause a service provider record to be downloaded from the registry, wherein the service provider record comprises at least one certificate for at least one network entity different from the service provider's server, the at least one network entity operating on the at least one available network and comprising at least one dynamic host configuration protocol (DHCP) server or at least one domain name system (DNS) server;
cause a connection to the at least one detected available network based at least partially on the service provider record;
receive, after causing the connection to the at least one detected available network, an authentication option based on a router advertisement (RA) option;
receive, after receiving said authentication option, configuration information from the at least one connected network; and
verify the received configuration information from the at least one connected network based on the authentication option, wherein verification comprises determining whether the received configuration information is signed with a digital certificate that corresponds to the at least one certificate in the accessed registry entry.

10. An apparatus according to claim 9 wherein the accessed registry entry includes certificates for at least one of a router, Dynamic Host Configuration Protocol (DHCP) server or Domain Name System (DNS) server of a service provider.

11. An apparatus according to claim 9 wherein the at least one memory including the computer program code is further configured to, with the at least one processor, cause the apparatus to receive a message comprising a signature from at least one of a router, DHCP server or DNS server, wherein the signature further comprises at least one of an identity or random number belonging to the apparatus.

12. An apparatus according to claim 9 wherein the at least one memory including the computer program code is further configured to, with the at least one processor, cause the apparatus to receive a message comprising a signature from at least one of a router, DHCP server or DNS server, wherein the message further comprises a hash of a public key used to sign the message, to determine a network entity from a service provider record that signed the message.

13. An apparatus according to claim 9 wherein the at least one memory including the computer program code is further configured to, with the at least one processor, cause the apparatus to receive a router advertisements, DHCP, or DHCPv6 messages, and to determine whether the received router advertisements, DHCP, or DHCPv6 messages are from a verified legitimate network entity and causing a connection to the verified access network in an instance in which the received messages contain a valid signature of a network element which is authorized to IP provision at least one mobile terminal associated to that access network.

14. An apparatus according to claim 9 wherein a network entity is authorized in an instance in which the network entity has a corresponding certificate in the registry or the network entity has a certificate that is issued by an entity that has a corresponding certificate in the registry.

15. An apparatus according to claim 9 wherein an IPv6 header option is defined to carry in a router advertisement a signature over an assigned IP address and an identity or random number belonging to the client.

16. An apparatus according to claim 9 wherein a signature includes at least one field, wherein one of the fields includes the FQDN of an entity that generated the digital signature.

17. An apparatus according to claim 9 wherein the at least one memory including the computer program code is further configured to, with the at least one processor, cause the apparatus to accept an IP address configuration information in an instance in which a signature is verified and at least one of the network entity has a corresponding certificate in the registry or the network entity has a certificate that is issued by an entity that has a corresponding certificate in the registry.

18. A computer program product comprising:
at least one computer readable non-transitory memory medium having program code stored thereon, the program code which when executed by an apparatus cause the apparatus at least to:
cause at least one available network to be detected;
cause a query to be transmitted that causes an online signup provider list to be downloaded and stored;
determine a fully qualified domain name (FQDN) for the at least one detected available network;
cause a registry entry to be accessed in a registry stored on a service provider's server that corresponds to the determined FQDN and cause a service provider record to be downloaded from the registry, wherein the service provider record comprises at least one certificate for at least one network entity different from the service provider's server, the at least one network entity operating on the at least one available network and comprising at least one dynamic host configuration protocol (DHCP) server or at least one domain name system (DNS) server;
cause a connection to the at least one detected available network based at least partially on the service provider record;
receive, after causing the connection to the at least one detected available network, an authentication option based on a router advertisement (RA) option;
receive, after receiving said authentication option, configuration information from the at least one connected network; and
verify the received configuration information from the at least one connected network based on the authentication option, wherein verification comprises determining whether the received configuration information is signed with a digital certificate that corresponds to the at least one certificate in the accessed registry entry.

19. A computer program product according to claim 18 wherein the accessed registry entry includes certificates for at least one of a router, Dynamic Host Configuration Protocol (DHCP) server or Domain Name System (DNS) server of the service provider.

20. A computer program product according to claim 18 further comprises program code which when executed by an apparatus cause the apparatus at least to receive a message comprising a signature from at least one of a router, DHCP server or DNS server, wherein the signature further comprises at least one of an identity or random number belonging to the apparatus.

* * * * *